(12) United States Patent
Yeh

(10) Patent No.: US 9,098,395 B2
(45) Date of Patent: Aug. 4, 2015

(54) LOGICAL BLOCK MANAGEMENT METHOD FOR A FLASH MEMORY AND CONTROL CIRCUIT STORAGE SYSTEM USING THE SAME

(75) Inventor: Chih-Kang Yeh, Kinmen County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 845 days.

(21) Appl. No.: 12/552,798

(22) Filed: Sep. 2, 2009

(65) Prior Publication Data

US 2011/0010489 A1  Jan. 13, 2011

(30) Foreign Application Priority Data

Jul. 9, 2009  (TW) .................................. 98123229 A

(51) Int. Cl.
- *G06F 12/00* (2006.01)
- *G06F 13/00* (2006.01)
- *G06F 13/28* (2006.01)
- *G06F 12/02* (2006.01)

(52) U.S. Cl.
CPC .... *G06F 12/0246* (2013.01); *G06F 2212/7202* (2013.01); *G06F 2212/7211* (2013.01)

(58) Field of Classification Search
USPC .................................................. 711/103, 209
See application file for complete search history.

(56) References Cited

U.S. PATENT DOCUMENTS

| | | | |
|---|---|---|---|
| 2008/0215800 A1* | 9/2008 | Lee et al. | 711/103 |
| 2009/0049234 A1* | 2/2009 | Oh et al. | 711/103 |
| 2009/0089501 A1* | 4/2009 | Ahn et al. | 711/113 |
| 2009/0313417 A1* | 12/2009 | Wan | 711/103 |
| 2010/0217938 A1* | 8/2010 | Schneider | 711/141 |

* cited by examiner

*Primary Examiner* — Charles Rones
*Assistant Examiner* — Sidney Li
(74) *Attorney, Agent, or Firm* — J.C. Patents

(57) ABSTRACT

A logical block management method for managing a plurality of logical blocks of a flash memory device is provided. The logical block management method includes providing a flash memory controller, grouping the logical blocks into a plurality of logical zones, wherein each logical block maps to one of the logical zones. The logical block management method also includes counting a use count value for each logical block, and dynamically adjusting mapping relations between the logical blocks and the logical zones according to the use count values. Accordingly, the logical block management method can effectively utilizing the logical zones to determine usage patterns of the logical blocks and use different mechanisms to write data, so as to increase the performance of the flash memory storage device.

19 Claims, 5 Drawing Sheets

LOGICAL BLOCK MANAGEMENT METHOD FOR A FLASH MEMORY AND CONTROL CIRCUIT STORAGE SYSTEM USING THE SAME

CROSS-REFERENCE TO RELATED APPLICATION

This application claims the priority benefit of Taiwan application serial no. 98123229, filed on Jul. 9, 2009. The entirety of the above-mentioned patent application is hereby incorporated by reference herein and made a part of specification.

BACKGROUND

1. Techonlogy Field

The present invention relates to a logical block management method for a flash memory and a flash memory control circuit and a flash memory storage system using the same.

2. Description of Related Art

With a quick development of digital camera, cell phone and MP3, demand of storage media by customers is increased greatly. Since a flash memory has the advantages of data non-volatile, energy saving, small size and none mechanical structure etc., it is suitable for portable applications, and especially for portable battery-powered products. A solid state drive is a storage device applying an NAND flash memory as a storage medium thereof.

Generally, a flash memory module in a flash memory storage device has a plurality of physical blocks, and the physical blocks are logically grouped into a system area, a data area, a spare area and a replacement area by a flash memory controller of the flash memory storage device. The physical blocks in the system area are used to store related important information of the flash memory storage device, and the physical blocks in the replacement area are used to replace damaged physical blocks in the data area or the spare area. Therefore, in a general accessing state, a host system cannot access the physical blocks in the system area and the replacement area. The physical blocks grouped in the data area can store valid data written according to a writing command, and the physical blocks grouped in the spare area are used to replace the physical blocks of the data area during execution of the writing command. To be specific, when the flash memory storage device receives the writing command from the host system to update (or write) data in the physical block of the data area, the flash memory storage device selects a physical block from the spare area, and writes old valid data stored in the physical block of the data area to be updated and new data into the physical block selected from the spare area, and further links the physical block written with the new data to the data area. Moreover, the physical block to be updated is erased and is linked to the spare area. To smoothly access the physical blocks storing data in an alternation manner, the flash memory storage device provides logical blocks to the host system. Namely, alternation of the physical blocks is reflected by recording and renewing mapping relations between the logical blocks and the physical blocks of the data area within a logical block-physical block mapping table, so that the host system only need to perform a writing operation to the provided logical blocks, and the flash memory storage device then can read data from or write data into the mapped physical blocks according to the logical block-physical block mapping table.

However, with progress of fabrication process of the flash memory, while volume design of each physical block becomes greater, time for moving old valid data is comparatively increased, so that performance of the whole system is decreased. Moreover, when a flash memory storage device is used as a storage medium for installing a computer operating system, the operating system may constantly access specific data (for example, a file allocation table (FAT)), so that the physical blocks of the flash memory storage device are frequently erased to complete the update of data. However, erase times of the physical blocks is limited (for example, the physical blocks may be damaged after ten thousand times of erase), so that in a case that the physical blocks are frequently erased, a lifespan of the flash memory storage device is greatly reduced.

Generally, a user or an operating system has a specific usage pattern for storing data in the storage device. For example, use frequency of some logical blocks are relatively high, and use frequency of some other blocks are relatively low. Therefore, if a write mechanism is designed according to the use frequency of each of the logical blocks, the performance of the flash memory storage device can be effectively improved, so as to prolong the lifespan of the flash memory storage device. However, in a case of a limited resource of the flash memory storage device, how to distinguish a frequently used and an infrequently used logical block during each execution of an access command while considering the operation performance is a key to implement "designing the write mechanism according to the use frequency of each of the logical blocks".

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention is directed to a logical block management method, which can effectively distinguish a logical block with relatively high write time (or use frequency) and a logical block with a relatively low write time (or use frequency).

The present invention is directed to a flash memory control circuit, which can execute the aforementioned logical block management method to effectively distinguish a logical block with relatively high write time (or use frequency) and a logical block with relatively low write time (or use frequency).

The present invention is directed to a flash memory storage system, which can execute the aforementioned logical block management method to effectively distinguish a logical block with relatively high write time (or use frequency) and a logical block with relatively low write time (or use frequency).

An exemplary embodiment of the present invention provides a logical block management method for managing a plurality of logical blocks of a flash memory storage device. The logical block management method includes providing a flash memory controller and grouping the logical blocks into a plurality of logical zones. The logical block management method also includes recording mapping relations between the logical blocks and the logical zones, wherein each of the logical blocks maps to one of the logical zones. The logical block management method further includes counting a use count value of each of the logical blocks and dynamically adjusting the mapping relations between the logical blocks and the logical zones according to the use count values by using the flash memory controller.

An exemplary embodiment of the present invention provides a flash memory control circuit for managing a plurality of logical blocks of a flash memory storage device. The flash memory control circuit includes a microprocessor unit, a flash memory interface unit, a host interface unit, and a block management unit. The flash memory interface unit and the host interface unit are coupled to the microprocessor unit. The block management unit is coupled to the microprocessor unit and used to group the logical blocks into a plurality of logical zones, and count a use count value of each of the logical blocks, wherein the block management unit dynamically adjusts mapping relations between the logical blocks and the logical zones according to the use count values.

An exemplary embodiment of the present invention provides a flash memory storage system including a connector, a flash memory chip and a flash memory controller. The flash memory controller is coupled to the connector and the flash memory chip and used to configure a plurality of logical blocks, group the logical blocks into a plurality of logical zones, and record mapping relations between the logical blocks and the logical zones, wherein each of the logical blocks maps to one of the logical zones. Moreover, the flash memory controller is further used to count a use count value of each of the logical blocks, and adjust the mapping relations between the logical blocks and the logical zones according to the use count values.

An exemplary embodiment of the present invention provides a flash memory storage system including a connector, a flash memory chip and a flash memory controller. The flash memory controller is coupled to the connector and the flash memory chip and used to configure a plurality of logical blocks and at least group the physical blocks into a data area and a spare area, wherein each of the logical blocks maps to at least one physical block. Moreover, the flash memory controller counts a use count value for each of the logical blocks, and groups at least one logical block of the logical blocks into a hot logical zone according to the use count value.

According to the above descriptions, in the present invention, the mapping relations between the logical blocks and the logical zones are dynamically adjusted according to the use count values of the logical blocks, so as to effectively distinguish logical blocks with relatively high write time (or use frequency) and logical blocks with relatively low write time (or use frequency) according to the logical zones.

In order to make the aforementioned and other features and advantages of the present invention comprehensible, several exemplary embodiments accompanied with figures are described in detail below.

It should be understood, however, that this Summary may not contain all of the aspects and exemplary embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EXEMPLARY EMBODIMENTS

Figure 1:
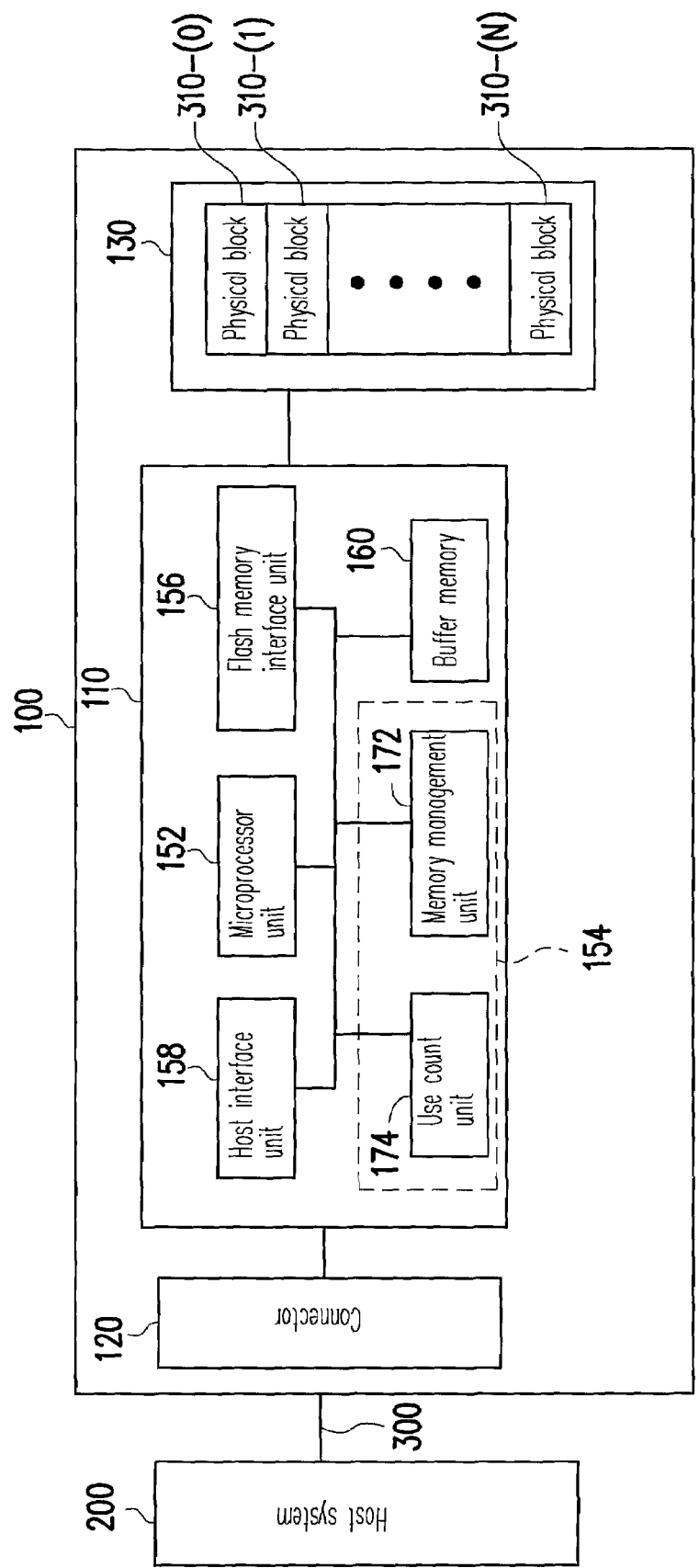
FIG. 1 is a schematic block diagram illustrating a flash memory storage system according to an exemplary embodiment of the present invention.

Reference will now be made in detail to the present preferred exemplary embodiments of the invention, examples of which are illustrated in the accompanying drawings. Wherever possible, the same reference numbers are used in the drawings and the description to refer to the same or like parts.

Exemplary embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A,B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

FIG. 1 is a schematic block diagram illustrating a flash memory storage system according to an exemplary embodiment of the present invention.

Referring to FIG. 1, a flash memory storage device 100 is generally utilized together with a host system 200, so that the host system 200 can write data into the flash memory storage device 100 or read data from the flash memory storage device 100. In the present exemplary embodiment, the flash memory storage device 100 is a solid state drive (SSD). Though, it should be understood that in another exemplary embodiment, the flash memory storage device 100 may also be a memory card or a flash drive.

The flash memory storage device 100 includes a flash memory controller (which is also referred to as a flash memory controlling circuit) 110, a connector 120 and a flash memory chip 130.

The flash memory controller 110 can execute a plurality of logical gate or control commands implemented by a hardware or firmware form to perform operations of data writing, data reading and data erasing, etc. to the flash memory chip 130 according to the commands of the host system 200. The flash memory controller 110 includes a microprocessor unit 152, a block management unit 154, a flash memory interface unit 156, a host interface unit 158 and a buffer memory 160.

The microprocessor unit 152 is a main control unit of the flash memory controller 110, which is utilized together with the block management unit 154, the flash memory interface unit 156, the host interface unit 158 and the buffer memory 160 to perform various operations to the flash memory storage device 100.

The block management unit 154 is coupled to the microprocessor unit 152 and is used to process the commands of the host system 200 to execute a block management mechanism and a data writing mechanism of the present exemplary embodiment. The block management unit 154 includes a memory management unit 172 and a use count unit 174, wherein the memory management unit 172 is used to execute the block management mechanism of the present exemplary embodiment, and the use count unit 174 is used to count write time of the blocks. Operations of the memory management unit 172 and the use count unit 174 are described in detail below with reference of figures.

In the present exemplary embodiment, the memory management unit 172 and the use count unit 174 are implemented in the flash memory controller 110 in type of firmware. For example, the memory management unit 172 and the use count unit 174 containing a plurality of machine commands are burned to program memory (for example, a read only memory (ROM)), and the program memory is embedded in the flash memory controller 110. During operation of the flash memory storage device 100, the machine commands of the memory management unit 172 and the use count unit 174 are executed by the microprocessor unit 152 to implement the block management mechanism, the data writing mechanism, and the write time counting mechanism of the present exemplary embodiment.

In another exemplary embodiment of the present invention, the machine commands of the memory management unit 172 and the use count unit 174 can also be stored in a specific area (for example, a system area of the flash memory used for storing system data) of the flash memory chip 130 in type of program codes. Similarly, during the operation of the flash memory storage device 100, the machine commands of the memory management unit 172 and the use count unit 174 are executed by the microprocessor unit 152. Moreover, in another exemplary embodiment of the present invention, the memory management unit 172 and the use count unit 174 can also be implemented in the flash memory controller 110 in type of hardware.

The flash memory interface unit 156 is coupled to the microprocessor unit 152 and used to access the flash memory chip 130. Namely, data to be written into the flash memory chip 130 is converted into a format that can be accepted by the flash memory chip 130 through the flash memory interface unit 156.

The host interface unit 158 is coupled to the microprocessor unit 152 for receiving and recognizing the commands transmitted by the host system 200. Namely, the commands and data transmitted by the host system 200 are transmitted to the microprocessor unit 152 through the host interface unit 158. In the present exemplary embodiment, the host interface unit 158 is a serial advanced technology attachment (SATA) interface. However, the present invention is not limited thereto, and the host interface unit 158 can also be a universal serial bus (USB) interface, an institute of electrical and electronic engineers (IEEE) 1394 interface, a peripheral component interconnect (PCI) express interface, a secure digital (SD) interface, a memory stick (MS) interface, a multimedia card (MMC) interface, a compact flash (CF) interface, an integrated device electronics (IDE) interface, or other suitable data transmission interfaces.

The buffer memory 160 is coupled to the microprocessor unit 152 and used to temporarily store system data (for example, a logical block-physical block mapping table) or data to be read or written by the host system 200. In the present exemplary embodiment, the buffer memory 160 is a static random access memory (SRAM). However, it should be understood that the present invention is not limited thereto, and a dynamic random access memory (DRAM), a magnetoresistive random access memory (MRAM), a phase change random access memory (PRAM) or other suitable memories can also be applied.

Moreover, though not illustrated, the flash memory controller 110 can further include general function modules such as an error correction unit and a power management unit, etc. for controlling the flash memory.

The connector 120 is coupled to the flash memory controller 110 and is used to couple to the host system 200 via a bus 300. In the present exemplary embodiment, the connector 120 is a SATA connector. However, it should be understood that the present invention is not limited thereto, and the connector 120 can also be a USB connector, an IEEE 1394 connector, a PCI Express connector, an SD connector, an MS connector, an MMC connector, a CF connector, an IDE connector or other suitable connectors.

The flash memory chip 130 is coupled to the flash memory controller 110 for storing data. The flash memory chip 130 has physical blocks 310-(0)~310-(N), wherein the physical block is a minimum erasable unit, i.e. each of the physical blocks contains a minimum number of memory cells that can be erased together. Each of the physical blocks is generally divided into a plurality of pages. Since in the present exemplary embodiment, the flash memory chip 130 is a multi level cell (MLC) NAND flash memory, the page is the minimum unit that can be programmed. In other words, the page is the minimum unit that data can be written into or read from. Each page generally includes a user data area and a redundant area. The user data area is used to store a user data, and the redundant area is used to store a system data (for example, an error checking and correcting code (ECC code)). In the present exemplary embodiment, each page of the flash memory chip 130 has 16 sectors. Generally, one sector is 512 bytes, so that one page is 8 thousand bytes. However, it should be noticed that the present invention is not limited thereto, and in another exemplary embodiment of the present invention, one page can also be 16 thousand bytes, 4 thousand bytes, 2 thousand bytes or other suitable sizes. In the present exemplary embodiment, the flash memory chip 130 is the MLC NAND flash memory, but the present invention is not limited thereto, and in another exemplary embodiment of the present invention, a single level cell (SLC) NAND flash memory can also be applied.

Figure 2:
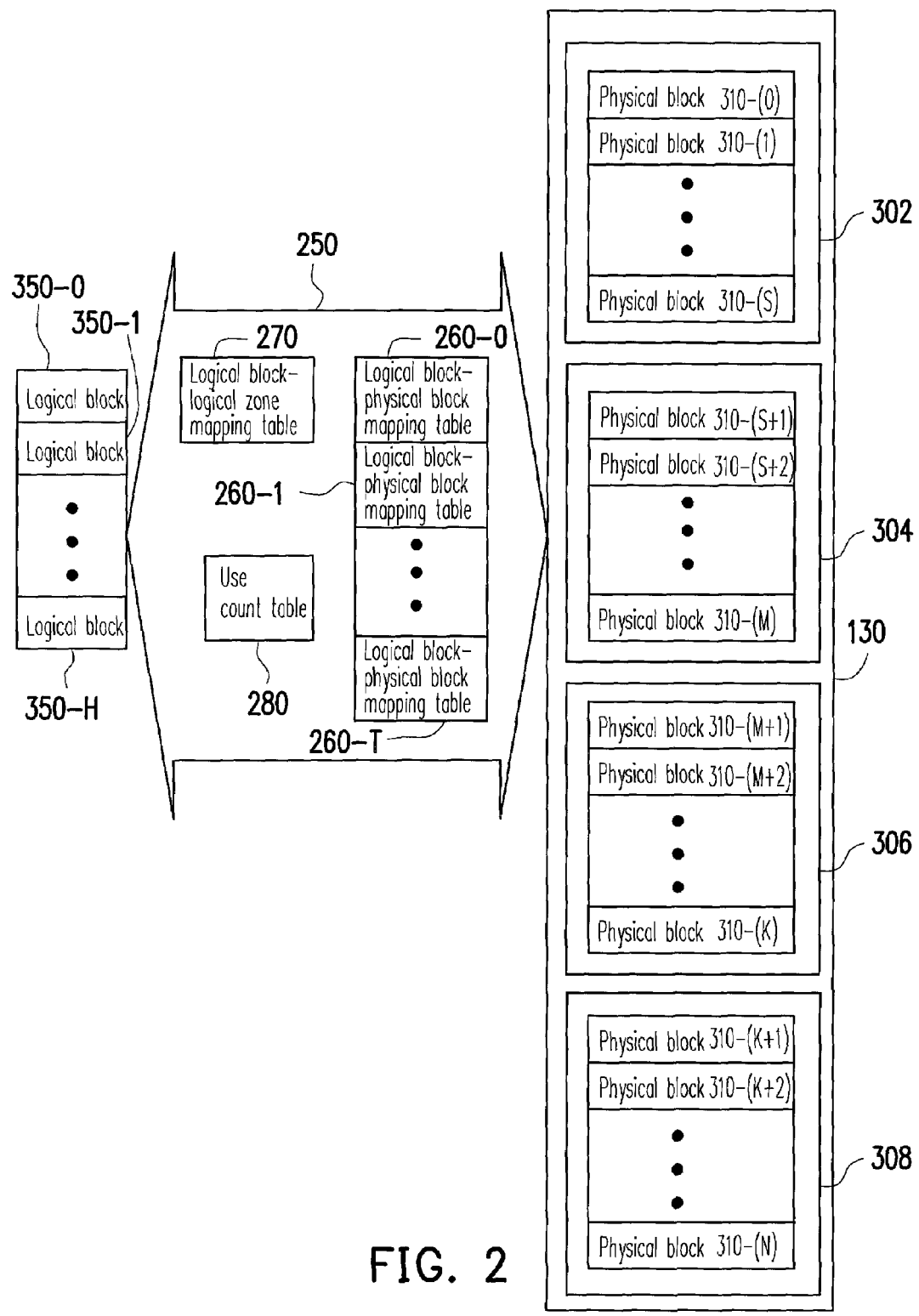
FIG. 2 is a schematic block diagram illustrating a flash memory chip according to an exemplary embodiment of the present invention.

FIG. 2 is a schematic block diagram illustrating a flash memory chip according to an exemplary embodiment of the present invention. The memory management unit 172 logically groups the physical blocks 310-(0)~310-(N) of the flash memory chip 130 into a system area 302, a data area 304, a spare area 306, and a replacement area 308. Here, the physical blocks 310-(0)~310-(N) refer to applicable physical blocks after the flash memory chip 130 is delivered by manufacturer.

The physical blocks 310-(0)~310-(S) logically belonged to the system area 302 are used to record system data, wherein the system data includes manufacturer and a model number of the flash memory chip, a zone number of the flash memory chip, the number of physical blocks in each zone, and the number of pages in each physical block, etc.

The physical blocks 310-(S+1)~310-(M) logically belonged to the data area 304 are used to store the user data, which are generally the physical blocks mapped to the logical blocks accessed by the host system 200. Namely, the physical blocks of the data area 304 are units for storing valid data.

The physical blocks 310-(M+1)~310-(K) logically belonged to the spare area 306 are used to alternate the physical blocks of the data area, so that the physical blocks of the spare area 306 can be empty or applicable physical blocks, i.e. blocks that are not stored with data or blocks stored with data marked to be invalid. Namely, the physical blocks in the data area and the spare area store the data written into the flash memory storage device 100 by the host system 200 in an alternating manner.

The physical blocks 310-(K+1)~310-(N) logically belonged to the replacement area 308 are used to replace the physical blocks. For example, after the flash memory chip 130 is manufactured, 4% physical blocks are preserved for replacement. Namely, when the physical blocks in the system area, the data area and the spare area are damaged, the physical blocks preserved in the replacement area can be used for replacing the damaged physical blocks (i.e. the bad blocks). Therefore, when the replacement area still has the applicable physical blocks, and if some physical blocks in the other areas are damaged, the memory management unit 172 can get the applicable physical blocks from the replacement area to replace the damaged physical blocks. When the replacement area has no applicable physical block, and if some physical blocks in the other areas are damaged, the flash memory storage device 100 enters a state of write protect, and data cannot be written therein.

As described above, when the flash memory controller 110 is about to write or update data in the physical block of the data area 304, the memory management unit 172 selects a physical block from the spare area 306, and write the new data and the old valid data in the physical block to be updated into the physical block selected from the spare area 306. Then, the memory management unit 172 links the selected physical block storing the new data to the data area 304, and erases the physical block in the data area that is to be updated, and further links the erased physical block to the spare area 306.

Since the flash memory storage device 100 stores the data to be written by the host system 200 in the alternating manner, the flash memory controller 110 provides logical blocks 350-0~350-H to the host system 200 for data accessing, and provides a conversion layer 250 to map the logical blocks 350-0~350-H to the physical blocks 310-(S+1)~310-(M) of the flash memory chip 130.

In the present exemplary embodiment, the conversion layer 250 has a logical block-physical block mapping table for recoding the physical blocks mapped to the logical blocks. Namely, the host system 200 only needs to access data of the provided logical blocks 350-0~350-H, and the flash memory controller 110 then can read data from or write data into the mapped physical blocks actually according to the logical block-physical block mapping table.

Moreover, it should be noticed that the logical block-physical block mapping table can be stored in the flash memory chip 130 (for example, in the system area 302 or the data area 304), and during the operation of the flash memory storage device 100, the logical block-physical block mapping table can be loaded to the buffer memory 160, so that the memory management unit 172 reads and updates the logical block-physical block mapping table. However, since a storage capacity of the buffer memory 160 is limited, it cannot temporarily store the logical block-physical block mapping tables recording the mapping relations of all of the logical blocks. Therefore, in the present exemplary embodiment, the memory management unit 172 groups the logical blocks 350-0~350-H into a plurality of logical zones, and configures the logical block-physical block mapping tables 260-0~260-T in a unit of the logical zone. In detail, each logical block belongs to one of the logical zones, and the memory management unit 172 configures a logical block-physical block mapping table for each logical zone. Therefore, when the host system 200 is about to access a certain logical block, the memory management unit 172 loads the corresponding logical block-physical block mapping table from the flash memory chip 130 according to the logical zone that the logical block to be accessed belongs to, and performs the data accessing according to the corresponding logical block-physical block mapping table. Thereafter, when a logical block of another logical zone is accessed, the memory management unit 172 stores the current logical block-physical block mapping table back to the flash memory chip 130, and loads another corresponding logical block-physical block mapping table.

To recognize the logical zone mapped to each of the logical block, in the present exemplary embodiment, the conversion layer 250 includes a logical block-logical zone mapping table 270 for recording mapping relations between the logical blocks and the logical zones. For example, the logical block-logical zone mapping table 270 can be stored in the flash memory chip 130 (for example, in the system area 302 or the data area 304), and during the operation of the flash memory storage device 100, the memory management unit 172 loads the logical block-logical zone mapping table 270 to the buffer memory 160, and then loads the corresponding logical block-physical block mapping table according to the logical block-logical zone mapping table 270. Moreover, when operation of the flash memory storage device 100 is ready to be shut down, the memory management unit 172 stores the logical block-logical zone mapping table 270 back to the flash memory chip 130.

Figure 3:
FIG. 3 is a diagram illustrating an example of a logical block-logical zone mapping table according to an exemplary embodiment of the present invention.

FIG. 3 is a diagram illustrating an example of a logical block-logical zone mapping table according to an exemplary embodiment of the present invention. Assuming the number of the logical blocks is 9, and the number of the logical zones is 3. However, FIG. 3 only illustrates an example, and the present invention is not limited thereto. For example, during an actual application, the number of the logical blocks can be 2048, and the number of the logical zones can be 64.

Referring to FIG. 3, the logical block-logical zone mapping table 270 S includes 9 blocks, and each block represents one logical block, wherein the blocks are arranged in directions from left to right and from top to bottom, and respectively represent the logical blocks 350-0~350-8. Moreover, a value recorded in each block represents the logical zone that the logical block corresponding to such block belongs to. For example, the logical blocks 350-0, 350-3 and 350-6 belong to the logical zone LZ1, the logical blocks 350-1, 350-4 and 350-7 belong to the logical zone LZ2, and the logical blocks 350-2, 350-5 and 350-8 belong to the logical zone LZ3.

In addition, in the present exemplary embodiment, the conversion layer 250 further includes a logical block use count table 280 for recording the use count value of each of the logical blocks. In detail, each time when the host system 200 executes a write command to a logical block, the use count unit 174 counts the corresponding use count value (for example, adds the write time value by 1). For example, when the host system 200 sends a write command to a page in a certain logical block, the write time value is added by 1. Then, when the host system 200 again sends another write command to a page in the same logical block, the write time value of this logical block is again added by 1, i.e. the write time value (i.e. the use count value) of this logical block is 2. Similarly, the logical block use count table 280 is stored in the flash memory chip 130 (for example, in the system area 302 or the data area 304), and during the operation of the flash memory storage device 100, the use count unit 174 loads the logical block use count table 280 to the buffer memory 160 for renewing. Moreover, when operation of the flash memory storage device 100 is ready to be shut down, the use count unit 174 stores the logical block use count table 280 back to the flash memory chip 130. In the present exemplary embodiment, the logical block use count table 280 is similar to the logical block-logical zone mapping table 270 (shown in FIG. 3), and a difference between them is that the values in the blocks in the logical block use count table 280 present the use count values. Particularly, in another exemplary embodiment of the present invention, the logical block use count table 280 and the logical block-logical zone mapping table 270 may be integrated into a single table for utilization.

It should be noticed that in the present exemplary embodiment, the memory management unit 172 can dynamically adjusting the mapping relations of the logical zones and the logical blocks in the logical block-logical zone mapping table 270 according to usage states of the logical blocks. In detail, during the operation of the flash memory storage device 100, the use count unit 174 records the times that the host system 200 sends the write command to each logical block to serve as the use count value, and the memory management unit 172 adjusts the mapping relations of the logical zones and the logical blocks when the use count value of the logical block is greater than a use count threshold value, so that the logical blocks being frequently written with data are concentrated in the same logical zone. Here, the use count threshold value is predetermined by a designer when the flash memory storage device 100 is originally manufactured. Namely, the use count threshold value is a design option of the flash memory storage device, which can be adjusted and optimised according to different demands. For example, in the present exemplary embodiment, the use count threshold value is predetermined to be 99.

Figure 4:
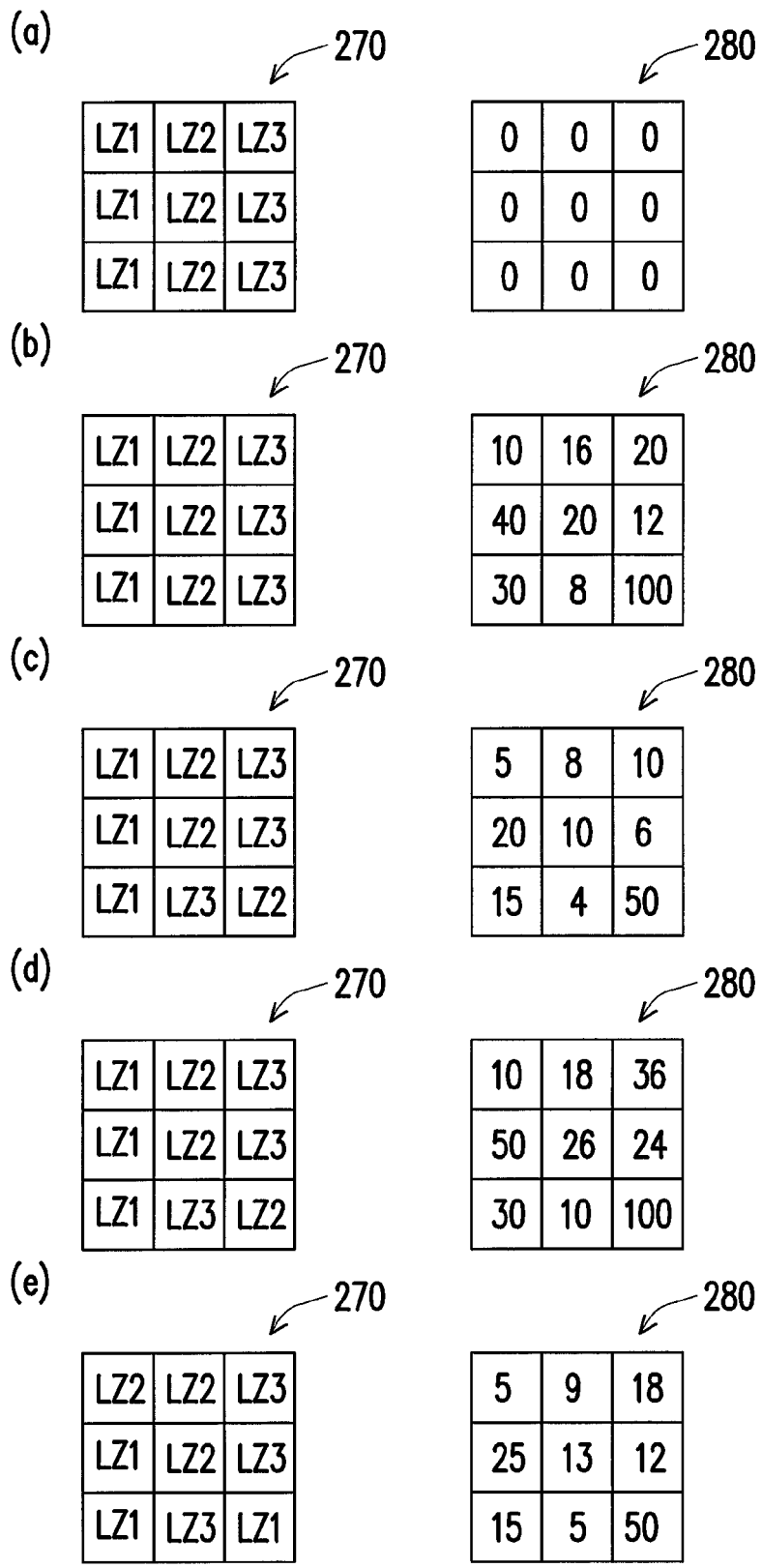
FIG. 4 is a diagram illustrating an example of dynamically adjusting a logical block-logical zone mapping table according to an exemplary embodiment of the present invention.

FIG. 4 is a diagram illustrating an example of dynamically adjusting a logical block-logical zone mapping table according to an exemplary embodiment of the present invention, wherein the memory management unit 172 sequentially groups the logical blocks into logical zones LZ1, LZ2 and LZ3 according to the use count values of the logical blocks. Namely, after the flash memory storage device 100 is used for a period of time, the time (or frequency) for the host system 200 sending the write commands to the logical blocks in the logical zone LZ1 is greater than that of the logical blocks in the logical zone LZ2, and the times (or frequent) for the host system 200 sending the write commands to the logical blocks in the logical zone LZ2 is greater than that of the logical blocks in the logical zone LZ3. Here, the logical zone where the host system 200 sends the write commands for relatively more times (or frequent) is referred to as a hot logical zone, and the logical zone where the host system 200 sends the write commands for relatively less times (or frequent) is referred to as a cold logical zone.

Referring to FIG. 4, assuming the number of the logical blocks is 9 (i.e. the logical blocks 350-0~350-8) and the number of the logical zones is 3 (i.e. the logical zones LZ1-LZ3), (a) of FIG. 4 shows initial mapping relations between the logical blocks and the logical zones and initial use count values of the logical blocks when the flash memory storage device 100 is delivered by the manufacturer.

Then, when the times for the host system 200 sending the write commands to the logical blocks is accumulated for a period of time (shown as (b) of FIG. 4), the memory management unit 172 determines that the use count value of the logical block 350-8 is greater than the use count threshold value (for example, the use count threshold value of 99). Therefore, the memory management unit 172 adjusts the mapping relations between the logical blocks and the logical zones. In detail, the memory management unit 172 updates the logical block-logical zone mapping table 270 to exchange the logical block 350-8 to the logical zone LZ2, and meanwhile exchanges a logical block with a minimum use count value (i.e. the logical block 350-7) in the logical zone LZ2 to the logical zone LZ3 (as that shown in (c) of FIG. 4), and the memory management unit 172 updates the logical block-physical block mapping tables corresponding to the logical zones LZ2 and LZ3.

It should be noticed that in the present exemplary embodiment, the memory management unit 172 exchanges the logical block with the minimum use count value in the logical zone LZ2 to the logical zone LZ3. However, the present invention is not limited thereto, and in another exemplary embodiment of the present invention, the memory management unit 172 may randomly exchange one of the logical blocks in the logical zone LZ2 to the logical zone LZ3.

Moreover, after the adjustment of the mapping relations between the logical blocks and the logical zones is completed, the use count unit 174 readjusts the use count values. For example, in the preset exemplary embodiment, the use count unit 174 divides each of the use count values by 2 to serves as a new use count value (as that shown in (c) of FIG. 4).

Similarly, after the flash memory storage device 100 is operated for a period of time (as that shown in (d) of FIG. 4), the memory management unit 172 determines that the use count value of the logical block 350-8 is greater than the use count threshold value, and again adjusts the mapping relations between the logical blocks and the logical zones. Wherein, the memory management unit 172 exchanges the logical block 350-8 to the logical zone LZ1, and meanwhile exchanges a logical block with a minimum use count value (i.e. the logical block 350-0) in the logical zone LZ1 to the logical zone LZ2, and the use count unit 174 readjusts the use count values (shown as (e) of FIG. 4).

During the operation of the flash memory storage device 100, adjustment of the mapping relations between the logical blocks and the logical zones that is similar as that shown in FIG. 4 is continuously performed, so that the logical blocks are grouped into the corresponding logical zones according to the use count (or use frequency) thereof. Namely, the logical blocks being frequently written with data are constantly adjusted until the logical blocks being frequently written with data are adjusted to the hottest logical zone.

In the present exemplary embodiment, after the adjustment of the mapping relations between the logical blocks and the logical zones is completed, the use count unit 174 readjusts the use count values by dividing the use count value of each of the logical blocks by a predetermined value. However, the present invention is not limited thereto. For example, in another exemplary embodiment of the present invention, the use count unit 174 may set all of the use count values to zero, or adjusts the use count values through other suitable ways.

Moreover, in the example shown in FIG. 4, the logical zone LZ1 is the hottest logical zone, the logical zone LZ2 is a secondary-hottest logical zone, and the logical zone LZ3 is the cold logical zone. However, the present invention is not limited thereto, and in another exemplary embodiment of the present invention, the logical zone LZ2 is the hottest logical zone, the logical zone LZ3 is the secondary-hottest logical zone, and the logical zone LZ1 is the cold logical zone.

Figure 5:
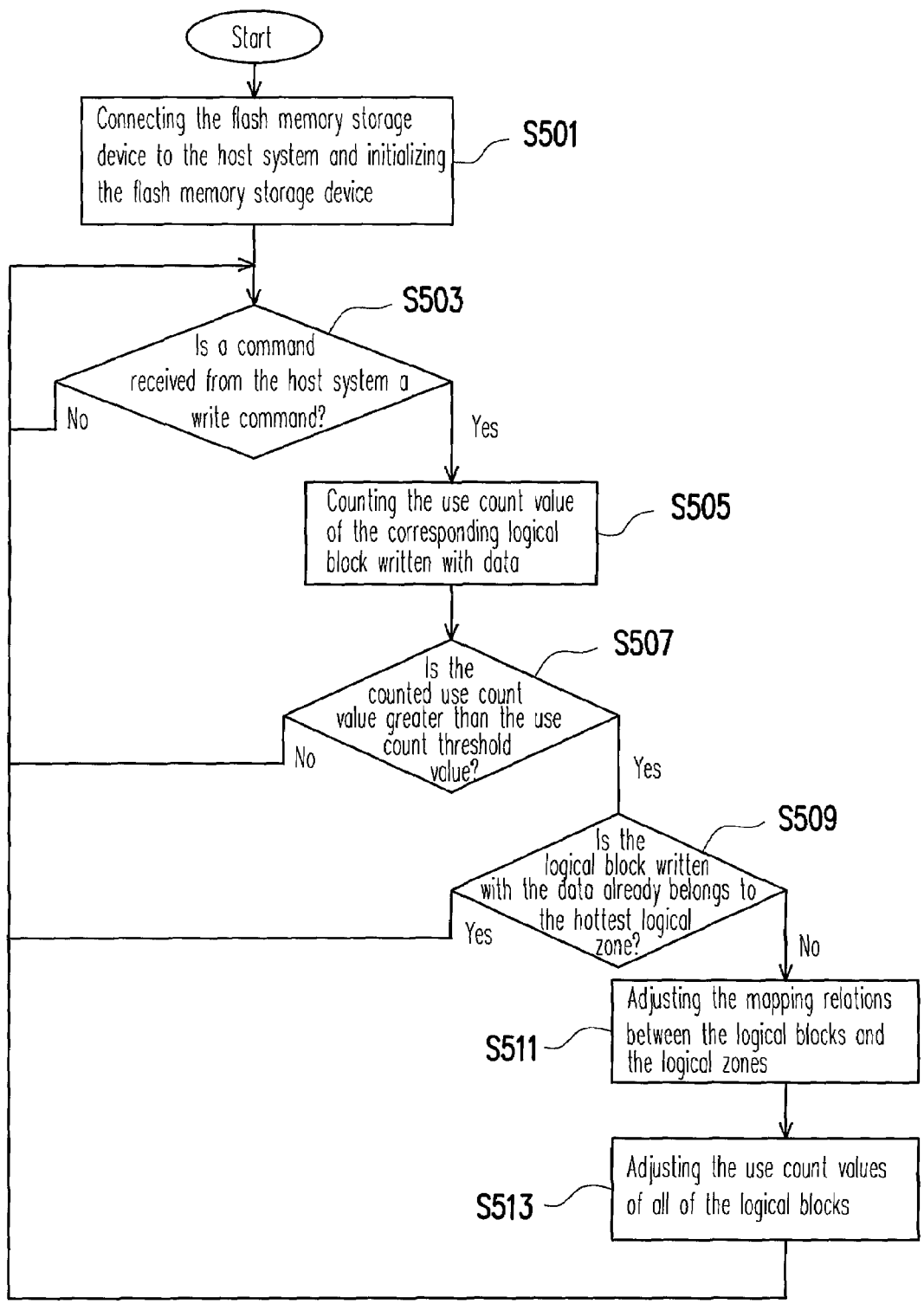
FIG. 5 is a flowchart illustrating a logical block management method according to an exemplary embodiment of the present invention.

FIG. 5 is a flowchart illustrating a logical block management method according to an exemplary embodiment of the present invention.

Referring to FIG. 5, first, in step S501, the flash memory storage device 100 is coupled to the host system 200 and is initialised. In detail, if the flash memory storage device 100 is used for the first time, the flash memory controller 110 formats the flash memory chip 130, and configures the logical blocks 350-0~350-H for mapping to the physical blocks of the flash memory chip 130, wherein the logical blocks are grouped into a plurality of logical zones (shown as FIG. 3). Moreover, if the flash memory controller 110 is not used for the first time, the flash memory controller 110 loads related information (for example, the logical block-logical zone mapping table, the logical block-physical block mapping table, the use count table, etc) from the flash memory chip 130.

Next, in step S503, the flash memory controller 110 is on standby and determines whether a command received from the host system 200 is a write command. It should be noticed that in the present exemplary embodiment, adjustment of the mapping relations between the logical blocks and the logical zones relates to the times for the host system sending the write commands to logical blocks. Therefore, only a state of receiving the write command is described in the flowchart of FIG. 5. If it is determined that the received command is not the write command, the step S503 in the flowchart of FIG. 5 is again executed.

If it is determined that the received command is the write command according to the step S503, in step S505, the use count unit 174 counts the use count value of the corresponding logical block being written with the data, and in step S507, the memory management unit 172 determines whether the counted use count value is greater than the use count threshold value.

If it is determined that the counted use count value is not greater than the use count threshold value, the step S503 in the flowchart of FIG. 5 is executed.

If it is determined that the counted use count value is greater than the use count threshold value, in step S509, the memory management unit 172 determines whether the logical block being written with the data already belongs to the hottest logical zone. If it is determined that the logical block being written with the data already belongs to the hottest logical zone (for example, the logical zone LZ1 shown in FIG. 4), the step S503 in the flowchart of FIG. 5 is executed. Conversely, if it is determined that the logical block being written with the data is not belonged to the hottest logical zone, in step S511, the memory management unit 172 adjusts the mapping relations between the logical blocks and the logical zones. The method for adjusting the mapping relations between the logical blocks and the logical zones has been described in detail with reference of FIG. 4, and therefore detailed description thereof is not repeated. Next, in step S513, the use count unit 174 adjusts the use count values of all of the logical blocks, and then the step S503 in the flowchart of FIG. 5 is executed. Here, the flow of FIG. 5 is ended when the operation of the flash memory storage device 100 is terminated.

According to the above descriptions, the flash memory controller 110 can effectively distinguish accessing frequencies of the logical blocks, and when the host system 200 accesses the logical blocks, accessing performance of the flash memory storage device 100 can be improved by using a corresponding write mechanism according to different use count (or use frequency) of the logical blocks. For example, when the host system 200 is about to write data into a logical block with a relatively high use count value, the flash memory controller 110 can temporarily store the data into a temporary storage area (for example, a dynamic random access memory (DRAM) (not shown) of the flash memory storage device 100). When the host system 200 is about to write data into a logical block with a relatively low use count value, the flash memory controller 110 directly write the data into the flash memory chip 130. Alternatively, in an example that the flash memory storage device is composed of a SLC NAND flash memory and a MLC NAND flash memory, when the host system 200 is about to write data into a logical block with a relatively high use count value, the flash memory controller 110 writes the data into the SLC NAND flash memory, and when the host system 200 is about to write data into a logical block with a relatively low use count value, the flash memory controller 110 writes the data into the MLC NAND flash memory.

It should be noticed that in the present exemplary embodiment, the use count unit 174 counts the use count values of the logical blocks according to the write commands, so as to determine usage patterns of the logical blocks. However, the present invention is not limited thereto, and in another exemplary embodiment of the present invention, the use count values of the logical block can also be determined according to write times, read times, and times of status reply commands or an amount of written data of the logical block. For example, in a case that the amount of written data is used as the use count values, the use count unit 174 counts the use count values of the logical block according to the number of sectors occupied by the data written into the logical block by the host system 200. For example, when the host system 200 write data of 5 sectors to a certain logical block, the use count values of such logical block is then added by 5.

Moreover, in the present exemplary embodiment, the memory management unit 172 and the use count unit 174 implement the block management mechanism of the present exemplary embodiment by using one block (i.e. the logical block and the physical block) as a management unit. However, the present invention is not limited thereto, and in another exemplary embodiment of the present invention, the memory management unit 172 and the use count unit 174 may manage the flash memory chip 130 by using one unit containing a plurality of blocks as a management unit. For example, two logical (physical) blocks are regarded as one logical (physical) unit, the memory management unit 172 performs data erasing in the unit of the logical (physical) unit containing two logical (physical) blocks, and the use count unit 174 counts the write times of each logical unit in the unit of the logical (physical) unit containing two logical (physical) blocks.

In summary, by dynamically adjusting the mapping relations between the logical blocks and the logical zones, the logical blocks with relatively high write frequencies and the logical blocks with relatively low write frequencies can be effectively distinguished, so that the previously described exemplary embodiments of the present invention have many advantages, including that different data write mechanisms can be applied according to different usage patterns of the logical blocks and the performance of the flash memory storage device may be increased, wherein the advantages aforementioned not required in all versions of the invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A logical block management method, for managing a plurality of logical blocks of a flash memory storage device, wherein the plurality of logical blocks are mapped to a plurality of physical blocks in the flash memory storage device, the logical block management method comprising:

providing a flash memory controller;

grouping the logical blocks into a plurality of logical zones, wherein the logical zones comprising a first logical zone, a second logical zone and a third logical zone;
recording mapping relations between the logical blocks and the logical zones, wherein each of the logical blocks maps to one of the logical zones;
counting a use count value for each of the logical blocks, wherein the use count value for each of the logical blocks is the number of times the corresponding logical block has been written to, wherein when a host system executes a write command to one of the logical blocks, the use count value of the corresponding logical block is increased, wherein the use count values of the logical blocks in the first logical zone is greater than the use count values of the logical blocks in the second logical zone, and the use count values of the logical blocks in the second logical zone is greater than the use count values of the logical blocks in the third logical zone;
adjusting the mapping relations between the logical blocks and the logical zones by using the flash memory controller according to the use count values, wherein the mapping relations between the logical blocks and the logical zones is adjusted by remapping one of the logical blocks mapped to the third logical zone among the logical zones to the second logical zone among the logical zones and remapping another logical block mapped to the second logical zone to the third logical zone in response to remapping the one of the logical blocks mapped to the third logical zone to the second logical zone, wherein the count value of the one of the logical blocks mapped to the third logical zone is greater than the count values of the logical blocks mapped to the first logical zone and the second logical zone; and
adjusting the use count values by using the flash memory controller after the step of adjusting the mapping relations between the logical blocks and the logical zone, wherein the use count values are divided by a predetermined value,
wherein, when the host system is to access a first logical block among the logical blocks, the memory management unit loads a first logical block-physical block mapping table from a flash memory chip according to the first logical zone that the first logical block to be accessed belongs to, and performs a data accessing according to the first logical block- physical block mapping table,
wherein, after the first logical zone is accessed, when a second logical block mapped to the second logical zone among the logical zones is to be accessed, the memory management unit stores the first logical block-physical block mapping table back to the flash memory chip, and loads a second logical block-physical block mapping table according to the second logical zone.

2. The logical block management method as claimed in claim 1, wherein the flash memory storage device comprises a single level cell (SLC) NAND flash memory and a multi-level cell (MLC NAND) flash memory, the logical block management method further comprising:
writing data corresponding to the write command into the SLC NAND flash memory when the use count value of the one of the logical block corresponding to the write command is greater than a use count threshold; and
writing the data corresponding to the write command into the MLC NAND flash memory when the use count value of the one of the logical block corresponding to the write command is less than the use count threshold value,
wherein the step of recording the mapping relations between the logical blocks and the logical zones comprises:
establishing a logical block-logical zone mapping table to record the mapping relations between the logical blocks and the logical zones.

3. The logical block management method as claimed in claim 1, wherein the logical zones at least comprise a hot logical zone and a cold logical zone.

4. The logical block management method as claimed in claim 3, wherein the step of adjusting the mapping relations between the logical blocks and the logical zones by the flash memory controller according to the use count values comprises:
determining whether the use count values of the logical blocks in the cold logical zone is greater than a use count threshold value; and
when the use count value of one of the logical blocks in the cold logical zone is greater than the use count threshold value, grouping the one of the logical block into the hot logical zone, selecting one of the logical blocks from the hot logical zone, and grouping the selected logical block into the cold logical zone.

5. The logical block management method as claimed in claim 4, wherein the use count value of the selected logical block is not greater than the use count values of the other logical blocks in hot the logical zone.

6. The logical block management method as claimed in claim 1, wherein the use count values comprise times for a host system sending write commands to the logical blocks or the number of sectors of data written into the logical blocks.

7. A flash memory control circuit, for managing a plurality of logical blocks of a flash memory storage device, wherein the plurality of logical blocks are mapped to a plurality of physical blocks in the flash memory storage device, the flash memory control circuit comprises:
a microprocessor unit;
a flash memory interface unit, coupled to the microprocessor unit;
a host interface unit, coupled to the microprocessor unit; and
a block management unit, coupled to the microprocessor unit and used to group the logical blocks into a plurality of logical zones, and count a use count value for each of the logical blocks, wherein the use count value for each of the logical blocks is the number of times the corresponding logical block has been written to, wherein when a host system executes a write command to one of the logical, the use count value of the corresponding logical block is increased, wherein the logical zones comprising a first logical zone, a second logical zone and a third logical zone, and the use count values of the logical blocks in the first logical zone is greater than the use count values of the logical blocks in the second logical zone, and the use count values of the logical blocks in the second logical zone is greater than the use count values of the logical blocks in the third logical zone,
wherein the block management unit adjusts mapping relations between the logical blocks and the logical zones according to the use count values, wherein the mapping relations between the logical blocks and the logical zones is adjusted by remapping one of the logical blocks mapped to the third logical zone among the logical zones to the second logical zone among the logical zones and remapping another logical block mapped to the second logical zone to the third logical zone in response to remapping the one of the logical blocks mapped to the third logical zone to the second logical zone, wherein the count value of the one of the logical blocks is greater than the count values of the logical blocks mapped to the first logical zone and the second logical zone, wherein the block management unit adjusts the use count values after the adjusting of the mapping relations between the logical blocks and the logical zones, wherein the use count values are divided by a predetermined value, wherein, when the host system is to access a first logical block among the logical blocks, the block management unit loads a first logical block-physical block mapping table from a flash memory chip according to the first logical zone that the first logical block to be accessed belongs to, and performs a data accessing according to the first logical block- physical block mapping table, wherein, after the first logical zone is accessed, when a second logical block mapped to the second logical zone among the logical zones is to be accessed, the block management unit stores the first logical block-physical block mapping table back to the flash memory chip, and loads a second logical block-physical block mapping table according to the second logical zone.

8. The flash memory control circuit as claimed in claim 7, wherein the flash memory storage device comprises a single level cell (SLC) NAND flash memory and a multi-level cell (MLC NAND) flash memory, wherein the block management unit comprises:

a memory management unit, used to record the mapping relations between the logical blocks and the logical zones, wherein each of the logical blocks maps to one of the logical zones; and a use count unit, used to count the use count value for each of the logical blocks, wherein the block management unit writes data corresponding to the write command into the SLC NAND flash memory when the use count value of the one of the logical block corresponding to the write command is greater than a use count threshold, or writes the data corresponding to the write command into the MLC NAND flash memory when the use count value of the one of the logical block corresponding to the write command is less than the use count threshold.

9. The flash memory control circuit as claimed in claim 8, wherein the memory management unit records the mapping relations between the logical blocks and the logical zones in a logical block-logical zone mapping table.

10. The flash memory control circuit as claimed in claim 9, wherein the logical zones at least comprise a hot logical zone and a cold logical zone.

11. The flash memory control circuit as claimed in claim 10, wherein the memory management unit determines whether the use count values of the logical blocks in the cold logical zone is greater than a use count threshold value, wherein when the use count value of one of the logical blocks is greater than the use count threshold value, the memory management unit groups the one of the logical block into the hot logical zone, selects one of the logical blocks from the hot logical zone, and groups the selected logical block into the cold logical zone.

12. The flash memory control circuit as claimed in claim 11, wherein the use count value of the selected logical block is not greater than the use count values of the other logical blocks in the hot logical zone.

13. The flash memory control circuit as claimed in claim 7, wherein the use count values comprise times for a host system sending write commands to the logical blocks or the number of sectors of data written into the logical blocks.

14. A flash memory storage system, comprising:
a connector, configured to couple to a host system;
a flash memory chip; and
a flash memory controller, coupled to the connector and the flash memory chip and used to configure a plurality of logical blocks, wherein the plurality of logical blocks are mapped to a plurality of physical blocks in the flash memory storage device, group the logical blocks into a plurality of logical zones, and record mapping relations between the logical blocks and the logical zones, wherein each of the logical blocks maps to one of the logical zones, wherein the logical zones comprising a first logical zone, a second logical zone and a third logical zone, wherein the flash memory controller is further used to count a use count value for each of the logical blocks, wherein the use count value for each of the logical blocks is the number of times the corresponding logical block has been written to, and adjusting the mapping relations between the logical blocks and the logical zones according to the use count values, wherein when the host system executes a write command to one of the logical blocks, the use count value of the corresponding logical block is increased, wherein the use count values of the logical blocks in the first logical zone is greater than the use count values of the logical blocks in the second logical zone, and the use count values of the logical blocks in the second logical zone is greater than the use count values of the logical blocks in the third logical zone, wherein the mapping relations between the logical blocks and the logical zones is adjusted by remapping one of the logical blocks mapped to the third logical zone among the logical zones to the second logical zone among the logical zones, and remapping another logical block mapped to the second logical zone to the third logical zone in response to remapping the one of the logical blocks mapped to the third logical zone to the second logical zone, wherein the count value of the one of the logical blocks mapped to the third logical zone is greater than the count values of the logical blocks mapped to the first logical zone and the second logical zone, wherein the flash memory controller adjusts the use count values after the adjusting of the mapping relations between the logical blocks and the logical zones, wherein the use count values are divided by a predetermined value, wherein, when the host system is to access a first logical block among the logical blocks, the flash memory controller loads a first logical block-physical block mapping table from a flash memory chip according to the first logical zone that the first logical block to be accessed belongs to, and performs a data accessing according to the first logical block- physical block mapping table, wherein, after the first logical zone is accessed, when a second logical block mapped to the second logical zone among the logical zones is to be accessed, the flash memory controller stores the first logical block-physical block mapping table back to the flash memory chip, and loads a second logical block-physical block mapping table according to the second logical zone.

15. The flash memory storage system as claimed in claim 14, wherein the flash memory controller records the mapping relations between the logical blocks and the logical zones in a logical block-logical zone mapping table, wherein the flash memory storage device comprises a single level cell (SLC) NAND flash memory and a multi- level cell (MLC NAND) flash memory, wherein the flash memory controller writes data corresponding to the write command into the SLC NAND flash memory when the use count value of the one of the logical block corresponding to the write command is greater than a use count threshold, or writes the data corresponding to the write command into the MLC NAND flash memory when the use count value of the one of the logical block corresponding to the write command is less than the use count threshold.

16. The flash memory storage system as claimed in claim 14, wherein the logical zones at least comprise a hot logical zone and a cold logical zone.

17. The flash memory storage system as claimed in claim 16, wherein the flash memory controller determines whether the use count values of the logical blocks in the cold logical zone is greater than a use count threshold value,
    wherein when the use count value of one of the logical blocks is greater than the use count threshold value, the flash memory controller groups the one of the logical block into the hot logical zone, selects one of the logical blocks from the hot logical zone, and groups the selected logical block into the cold logical zone.

18. The flash memory storage system as claimed in claim 17, wherein the use count value of the selected logical block is not greater than the use count values of the other logical blocks in the hot logical zone.

19. The flash memory storage system as claimed in claim 14, wherein the use count values comprise times for a host system sending write commands to the logical blocks or the number of sectors of data written into the logical blocks.

\* \* \* \* \*